Patented June 6, 1933

1,912,554

UNITED STATES PATENT OFFICE

JAMES F. WALSH, OF SOUTH ORANGE, NEW JERSEY, ASSIGNOR TO CELLULOID CORPORATION, A CORPORATION OF NEW JERSEY

PLASTIC GLASS-SUBSTITUTE

No Drawing. Application filed March 10, 1930. Serial No. 434,815.

This invention pertains to the general class of glass substitutes, and particularly to the class of glass substitutes of organic compounds capable of being molded at comparatively low temperatures.

In the imitation of food products such as Jello, etc., for window display purposes, it has been customary to use glass articles or molds colored or painted to imitate the natural food article. This necessitates the melting of glass at over 1000° C. At this high temperature fruit and organic matter cannot be embedded into the glass, as an immediate carbonization will take place. In consequence, plaster of Paris compositions have been employed to imitate cherries, pears, etc. Moreover, glass cannot be colored with organic dyes etc., thus limiting to a large extent, may color effects and configurations. The fragile nature of glass and lack of flexibility or moldability at low temperatures have also militated against its adoption, as has also its tendency to become frosted in cold weather. Rosin and paraffin imitations also fail to meet the essential requirements, being attended with brittleness, color, odor, lack of transparency, etc. Gelatin compositions are objectionable on account of their tendency to dissolve in or absorb water. Moreover, none of the preparations tried have possessed an antiseptic, germicidal or preserving power for the food product embedded therein.

An object of my invention is the production of a glass substitute that can be molded or melted at comparatively low temperatures (below 200° C.), for the production of imitation food products or preservation of same for display purposes, etc.

I have discovered that the aldehyde condensation products of toluene sulfonamids, single or mixed, either alone or in conjunction with modifiers are capable of giving transparent, colorless plastic materials that can be utilized to advantage for molding or imitating food products. An example is a condensation product produced by the reaction of formaldehyde or para formaldehyde on para toluene sulfonamid such as is disclosed in U. S. Patent 1,564,664. Depending on the extent of condensation, the toluene isomers or mixtures employed, catalyst used, etc., these resins can be made soft or flowable, plastic, semi-hard, or hard and solid. A type preferred is one that can be melted or poured at about the temperature of boiling water and which regains its solidity or rigidity when cooled to room temperature. Such a product results from the reaction of formaldehyde on the mixture of ortho and para toluene sulfonamid. Modifiers such as cellulose esters, plasticizers, resins, drying oils or dyes, pigments and fillers can be added to alter or produce any desired characteristics.

If the resin to be employed is not sufficiently free of color to suit the particular requirement, the same may be decolorized by decolorizing carbon or other suitable means.

The toluene sulfonamid-aldehyde resins are melted in a container either by direct application of heat or in a water or oil bath. The modifiers or coloring agents can be added at this stage. The resin is then poured in the molds that have been greased or otherwise treated to permit an easy discharge upon cooling. If the object is not to be removed from the mold as in a glass container, etc., the necessity of surfacing or greasing the mold is, of course, obviated. While the mass is still in a molded or viscous state, the food product to be preserved or imbedded is introduced into position and allowed to set by cooling. Different colored layers or striations can be readily made by allowing one layer to cool or set before superimposing the next layer. A froth effect can also be produced by stirring during cooling and with the assistance of agents liberating gases such as a mixture of carbonates and acids.

The resulting molded articles can be lacquered, painted or varnished if desired. Instead of melting the resin it can be molded directly by heat in the mold itself for which purpose a harder type of resin is to be preferred. The resin can also be dissolved in suitable solvents such as acetone, alcohol, ethyl acetate, etc. and then poured into the mold and the solvent allowed to evaporate. Thin films or layers can be produced thereby.

It is hereby understood that other amide condensation products can be employed such as the benzene and xylene derivatives and that in place of formaldehyde we may employ para-aldehyde, etc.

The following are a few suitable formulæ which are given merely by way of illustration.

*Formula A*

A condensation product of formaldehyde—with a mixture of ortho and paratoluene sulfonamid, colored, or pigmented as desired_____ 100 parts

*Formula B*

A condensation product of formaldehyde—with a mixture of ortho and paratoluene sulfonamid, colored or pigmented as desired_____ 100 parts
Tricresyl phosphate_____ 10 parts

*Formula C*

A condensation product of formaldehyde—with a mixture of ortho and paratoluene sulfonamid, colored or pigmented as desired (hard solid type)_____ 100 parts
Dibutyl phthalate_____ 25 parts

*Formula D*

A condensation product of formaldehyde—with a mixture of ortho and paratoluene sulfonamid, colored or pigmented as desired_____ 100 parts
Cellulose acetate_____ 25 parts
Dimethyl phthalate_____ 5 parts A further object of my invention is a production of a plastic glass substitute that may be made as clear as glass, and that will not become frosted in cold surroundings or collect moisture as readily as glass.

A further object of my invention is a production of a glass substitute that is plastic, resists shock, is readily molded and is comparatively non-brittle, has no corrosive action, does not exude in sunlight, does not decompose, is simple in formula, and is not substantially affected by climatic changes or conditions and is otherwise highly satisfactory for its intended purpose.

A further object of my invention is the production of a plastic material that can be employed to imitate food products, beverages, or to preserve or protect biological or anatomical specimens, bodies, fossils, plants, etc.; that is durable, rodent proof; that can be readily colored in multitudinous ways with all kinds of colors and pigments, that withstands soap solutions and cleaning powders, that will not turn white, that is oil proof, that can be readily cemented and mounted, and that faithfully reproduces the finest details of a mold; that is comparatively cheap, that is non-inflammable, odorless, tasteless, and that holds its shape and color indefinitely.

Many other objects and advantages will become apparent to persons skilled in the art as the specification proceeds.

*Formula E*

A condensation product of formaldehyde—with a mixture of ortho and paratoluene sulfonamid, colored or pigmented as desired_____ 100 parts
Ester gum_____ 25 to 100 parts The toluene sulfonamid-aldehyde resins can also be modified by the incorporation of other synthetic resins such as, phenol-aldehyde resins such as Bakelite; glycerol phthalate anhydride resins such as glyptals; urea formaldehyde condensation products such as Pollapas, Beatle; polymerized vinyl esters such as vinyl acetate; or polymerized indene and coumarone resins.

In fact, some of these resins such as the polymerized vinyl acetate can be employed alone for the same purposes to which the toluene sulfonamid resins are herein recommended.

The products thus made can be formed into any desired shape, can be readily repaired, laminated, embossed, decorated and cut to size or it is otherwise highly satisfactory for its intended purpose.

It is to be understood that the foregoing detailed description is given merely by way of illustration, and that many variations may be made therein, without departing from the spirit of my invention.

Having described my invention, what I claim and desire to secure by Letters Patent is:

For the employment in the preparation of an article of manufacture for displaying perishable specimens, a transparent composition containing a toluene sulfonamid-formaldehyde resin having a melting point below 100° C. but above room temperatures.

In testimony whereof, I have hereunto subscribed my name.

JAMES F. WALSH.

CERTIFICATE OF CORRECTION.

Patent No. 1,912,554.  June 6, 1933.

JAMES F. WALSH.

It is hereby certified that error appears in the printed specification of the above numbered patent requiring correction as follows: Page 2, line 46, beginning with the words "A further" strike out all to and including "proceeds." in line 78, and insert the same after line 39, page 1; and that the said Letters Patent should be read with this correction therein that the same may conform to the record of the case in the Patent Office.

Signed and sealed this 8th day of August, A. D. 1933.

M. J. Moore.

(Seal) Acting Commissioner of Patents.